United States Patent
Langley et al.

(10) Patent No.: US 11,068,904 B1
(45) Date of Patent: Jul. 20, 2021

(54) PROVIDING AGGREGATED STATISTICAL INFORMATION RELATING TO CUSTOMER REPRESENTATIVE'S PERFORMANCE

(71) Applicant: United Services Automobile Association, San Antonio, TX (US)

(72) Inventors: Guy R. Langley, San Antonio, TX (US); Jason W. Lindley, Schertz, TX (US); Donald H. Griffin, Jr., Peoria, AZ (US); Elizabeth Garretson, Fair Oaks Ranch, TX (US); Ryan R. Barth, San Antonio, TX (US); Francisco A. Duran, San Antonio, TX (US); Ann C. Tarrillion, San Antonio, TX (US); David W. Roberts, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 746 days.

(21) Appl. No.: 15/139,068

(22) Filed: Apr. 26, 2016

Related U.S. Application Data

(60) Provisional application No. 62/153,282, filed on Apr. 27, 2015.

(51) Int. Cl.
  *G06Q 30/00* (2012.01)
  *G06Q 30/06* (2012.01)
  *H04M 3/42* (2006.01)

(52) U.S. Cl.
  CPC ....... *G06Q 30/016* (2013.01); *G06Q 30/0631* (2013.01); *H04M 3/42195* (2013.01)

(58) Field of Classification Search
  None
  See application file for complete search history.

(56) References Cited

U.S. PATENT DOCUMENTS

| | | | | |
|---|---|---|---|---|
| 6,215,865 | B1 * | 4/2001 | McCalmont | H04M 3/51 379/212.01 |
| 8,326,643 | B1 * | 12/2012 | Eshkenazi | G06Q 30/02 705/1.1 |
| 8,370,155 | B2 * | 2/2013 | Byrd | H04M 3/51 704/270 |
| 9,112,973 | B2 * | 8/2015 | Hamlin | H04M 3/5175 |
| 9,264,667 | B1 * | 2/2016 | Mande | H04N 7/15 |
| 10,152,681 | B2 * | 12/2018 | Stephan | G06Q 10/063 |

(Continued)

OTHER PUBLICATIONS

Paula Bernier; "The History and Advancement of the Contact Center and the Customer Experience"; Aug. 3, 2012 (Year: 2012).*

(Continued)

*Primary Examiner* — Naeem U Haq
*Assistant Examiner* — Norman Donald Sutch, Jr.
(74) *Attorney, Agent, or Firm* — Locke Lord LLP; Christopher J. Capelli

(57) ABSTRACT

A computer-implemented method for providing performance information related to a customer service representative. A processor aggregates statistical data related to customer service representatives performance. A menu is then caused to be generated and displayed indicating a plurality of menu items. Each of the plurality of menu items corresponds to one of a plurality of the work-related types of data. Additionally, displayed and processed are one or more work-related alerts in response to receiving the one or more work-related alerts.

14 Claims, 8 Drawing Sheets

(56) References Cited

U.S. PATENT DOCUMENTS

| | | | |
|---|---|---|---|
| 10,192,179 B1* | 1/2019 | Agarwal | G06Q 10/063114 |
| 10,832,329 B1* | 11/2020 | Jenkins | G06Q 40/08 |
| 2005/0286709 A1* | 12/2005 | Horton | G06Q 30/02 |
| | | | 379/265.09 |
| 2006/0153357 A1* | 7/2006 | Acharya | H04M 3/5191 |
| | | | 379/266.01 |
| 2007/0139212 A1* | 6/2007 | Kaundinya | G06Q 10/063114 |
| | | | 340/692 |
| 2011/0307374 A1* | 12/2011 | Grundner | G06Q 20/10 |
| | | | 705/39 |
| 2012/0224020 A1* | 9/2012 | Portman | H04M 3/5133 |
| | | | 348/14.02 |
| 2014/0198905 A1* | 7/2014 | Clark | H04M 3/42195 |
| | | | 379/209.01 |
| 2014/0344169 A1* | 11/2014 | Phelps | G06Q 30/016 |
| | | | 705/304 |
| 2015/0195406 A1* | 7/2015 | Dwyer | H04M 3/5175 |
| | | | 379/265.07 |
| 2015/0310377 A1* | 10/2015 | Schlumberger | G06Q 10/063114 |
| | | | 705/7.15 |
| 2015/0312417 A1* | 10/2015 | Conway | H04M 3/523 |
| | | | 379/265.09 |
| 2016/0048502 A1* | 2/2016 | Montenegro | G06Q 30/016 |
| | | | 379/265.1 |
| 2016/0217419 A1* | 7/2016 | Majumdar | G06F 16/215 |

OTHER PUBLICATIONS

Anonymous; "Ventyx Customer Suite Enhances Customer Service Efficiency with IVR Integration at City of Virginia Beach"; May 20, 2008; PR Newswire Association LLC (Year: 2008).*

* cited by examiner

800

802
Dale Rogers                                    Edit
Cable Installation Technician at Time Warner Cable
26 years old
Permanent Address
254 Cherry Lane
Chicago, IL 60623

804
Member Notes
• Excited to learn about investing
•

95%           P&C              —              5 yrs
Satisfaction  Eligibility   Special Status    Tenure

806
FAMILY   Check photo for details                Edit 27 years old      3 years old      1 month old    Add family member
Melissa           Sally            Sam
WIFE              DAUGHTER         SON

808
PREFERENCES

Product Reviews              Channels
FREE CHECKING                WEB
★★★★★ review              MOBILE
SAVINGS                      PHONE
★★★★★ review              IN-PERSON

810
WHAT'S GOING ON

Local Time
5:24 PM

Current Events
• Chicago Bulls vs. Miami Heat: The Eastern Conference debate
• Chicago small businesses anticipate their companies economic outlook will improve in the next 12-18 months.

812
Interests
• Fishing at the Lake
• Mountaineering
•

FIG. 8

PROVIDING AGGREGATED STATISTICAL INFORMATION RELATING TO CUSTOMER REPRESENTATIVE'S PERFORMANCE

CROSS REFERENCE TO RELATED APPLICATIONS

This application claims priority to U.S. Patent Application Ser. No. 62/153,282 filed Apr. 27, 2015 which is incorporated herein by reference in its entirety.

FIELD OF THE INVENTION

The present invention relates to support systems for customer service representatives, and more particularly, to providing call center representatives with easy access to customer related data and aggregated statistical information related to call center representative's performance.

BACKGROUND OF THE INVENTION

Customer service representatives are often responsible for a wide variety of tasks. In addition to being proficient in accomplishing particular tasks like updating addresses or other status changes, providing new or updated quotes, responding to billing inquiries, cancelling and renewing services, and entering data related to the customer, the customer service representative is expected to be more than cordial, pleasant, engaging and generally charming.

To support customer service representatives, each has a workstation. The customer service representative relies on their workstation to provide them with information quickly in order to maintain conversational flow with the customer.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer-implemented method for providing performance information related to a customer service representative is described in which, a processor aggregates statistical data related to customer service representatives performance. A menu is then caused to be generated and displayed indicating a plurality of menu items. Each of the plurality of menu items corresponds to one of a plurality of the work-related types of data. Additionally, displayed and processed are one or more work-related alerts in response to receiving the one or more work-related alerts.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein:

FIG. 8 is an exemplary screen shot for providing product recommendations to a customer based on the customer's social media data in accordance with an embodiment of the present application.

DETAILED DESCRIPTION OF CERTAIN EMBODIMENTS

Figure 1:
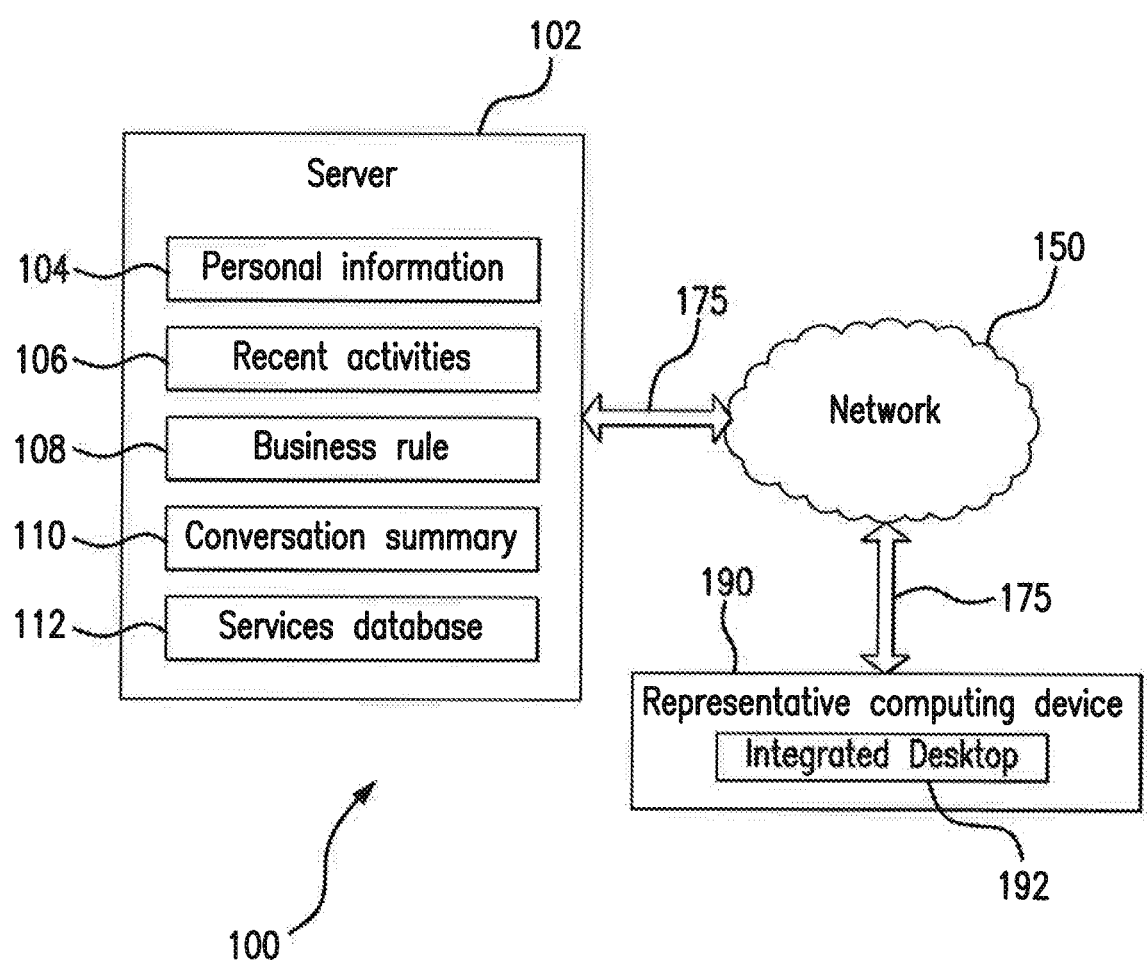
FIG. 1 is an exemplary system for streamlining customer interactions.

The below illustrated embodiments are directed to streamlining and improving customer interactions based on analysis of all available data relevant to the customer. It is to be appreciated that the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise, Thus, for example, reference to "a stimulus" includes a plurality of such stimuli and reference to "the signal" includes reference to one or more signals and equivalents thereof known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the certain embodiments described herein, Thus the certain embodiments are not to be understood to be limited by What has been particularly shown and described, except as indicated by the appended claims.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, "loss related data" means data or information relating to a loss or potential loss to insured property.

As used herein, "insured property" means a dwelling, other buildings or structures, personal property, or business property that may be covered by an insurance policy.

Referring to FIG. 1, a hardware diagram depicting a system 100 in which the processes described herein can be executed is provided for exemplary purposes. In one embodiment, system 100 includes a server 102 communicating with a representative computing device 190 across a network 150 with communication channels 175. The server 102 stores personal information 104 about customers, recent activities data 106 related to the customers, business rules 108 to be applied as described herein, conversation summaries 110 that are generated, and a services database 112, which includes information about various services and products a company may offer.

For exemplary purposes only, personal information 104 about customers may include the customer's legal name, what name they preferred to be called by, names of their family members (including former family members such as ex-spouses), ages for the customer and their family, how the customer is eligible for coverage (if applicable). In addition, personal information 104 may also include individual customers' social media data. Each customer's social media data may be obtained from various online and/or offline sources, such as the contact list from the user's email account(s) or messaging account(s), the online chat or discussion groups and forums, websites, etc.

Recent activities data 106 by the customer may include information related to the customer enrolling in a service that the company offers (e.g., mortgage, automobile loan, auto/home/life insurance, banking, and credit card), changing the settings of a service already enrolled in (e.g., raising the deductible and lowering the premium of an auto insurance policy), calling the company to ask a question and/or discuss a topic, researching information on the company's website, and/or researching information on the internet and later visiting the company's website (e.g., wherein the company's servers may glean past Internet activities based on "cookies").

Business rules 108 may reside in a business rules engine and may include associations, correlations and/or causations between (1) customer's personal and/or social media information and/or past activities and (2) future activities. For example, a business rule may reflect the relationship between (1) a child attaining the age of 15 and (2) adding another member to an auto insurance policy. In another example, a business rule may associate (1) browsing the company's website searching for life insurance information and (2) the subsequent phone call to the company being a request to (2a) enroll in a life insurance policy, or (2b) change the settings of an existing life insurance policy. In yet another example, a business rule may associate (1) a customer attaining retirement age and (2) the customer lowering their life insurance premium to a lower amount.

In one embodiment, a conversation summary 110 may include synopsis of information related to a series of topics discussed between the customer and the company's representative. For example, if the customer is about to turn 65 years old and has a child about to turn 15 years old, the conversation summary 110 may include textual summary of the discussion related to amendment of customer's life insurance policy, in yet another example, a conversation summary may include customer representative's questions asking about each service the customer is enrolled in and/or each product the customer utilizes with reference being made to the most recent event associated with each service/product (e.g., the first question may be asking if the customer wants to amend their recently added home insurance policy, and the second question may be asking the customer about the additional member she added to her auto insurance policy a year ago).

The services database 112 includes information related to the customer's enrollment in any services that are offered by the company. Such information may include the details of the customer's policies, the details of previous settings to current policies, and the details of the settings to previous policies the customer has enrolled in. For example, if a company offers credit card services, mortgage services, banking services, automobile loan services, investment services, insurance services and housing services, the services database may include information related to their customers' involvement with those services.

In various embodiments of the present invention, the company (not shown explicitly) Q hosts a Web site to provide access for company customers to research, review, and purchase various services such as financial services including insurance, banking, real estate, investing, retirement planning, and shopping. This Web site is the consumer front end of the customer service representative system 100. Beyond interaction with the company Web site, the customers can also contact customer service representatives by telephone, instant messaging, chat rooms and the like.

In one embodiment, representative computing device 190 may be configured to run one or more applications, such as, but not limited to integrated desktop application 192. According to one embodiment, integrated desktop 192 facilitates customer representative's interaction with the customer. For example, integrated desktop 192 may present to the customer service representative a plurality of screens related to the customer and/or related to representative's performance, as discussed below.

It is to be further appreciated that computer network 150, upon which the embodiments described herein my interact and/or function, can include a local area network (LAN) and a wide area network (WAN), other networks such as a personal area network (PAN), or any combination thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

Figure 2:
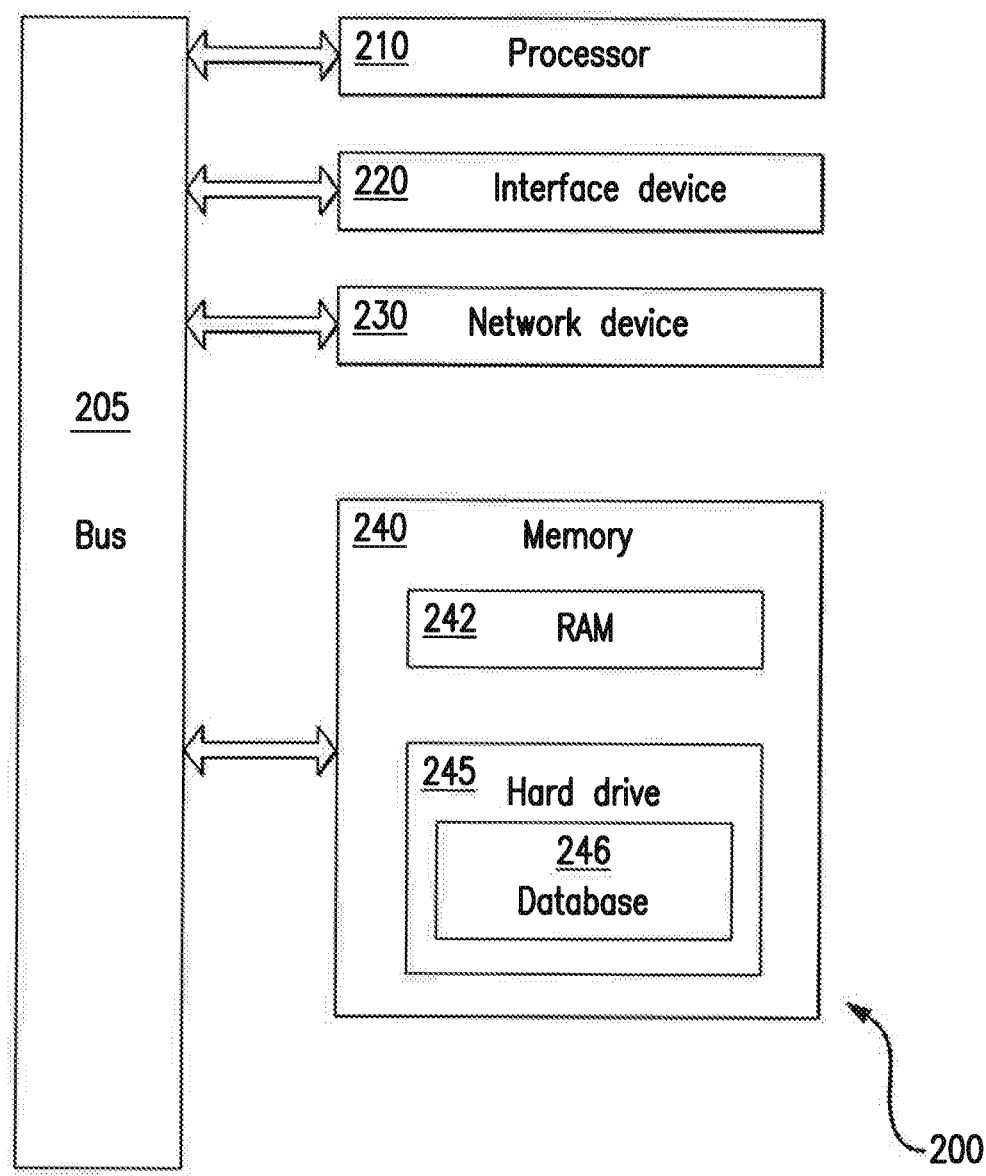
FIG. 2 is an illustration of an embodiment of a computing device.

Turning now to FIG. 2, illustrated therein is an exemplary embodiment of computing device 200 for use in the system 100. Such a computing device 200 is exemplary of how a server 102 and a representative computing device 190 may be configured. The following discussion is principally with respect to the computing device 200 when functioning as the server 102. The device 200 preferably includes bus 205, over which intra-device communications travel. A processor 210, interface device 220, network device 230, and memory 240 all communicate across the bus 205.

The term "module"/"engine" is used herein to denote a functional operation that may, be embodied either as a stand-alone component or as an integrated configuration of a plurality of subordinate components. Thus, "modules"/ "engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 240 is a computer-readable medium encoded with a computer program. Memory 240 stores data and instructions that are readable and executable by processor 210 for controlling the operation of processor 210. Memory 240 may be implemented in random access memory 242 (RAM), a non-transitory computer readable medium, volatile or non-volatile memory, solid state storage devices, magnetic devices, hard drive 245, database 246, a read only memory (ROM), or a combination thereof.

Processor 210 is an electronic device configured of logic circuitry that responds to and executes instructions. Processor 210 outputs results of an execution of the methods described herein. Alternatively, processor 210 could direct the output to a remote device (not shown) via network 150.

It should be understood that computing devices 200 each generally include at least one processor, at least one interface, and at least one memory device coupled via buses. Computing devices 200 may be capable of being coupled together, coupled to peripheral devices, and input/output devices. Computing devices 200 are represented in the drawings as standalone devices, but are not limited to such, Each can be coupled to other devices in a distributed processing environment.

Figure 3:
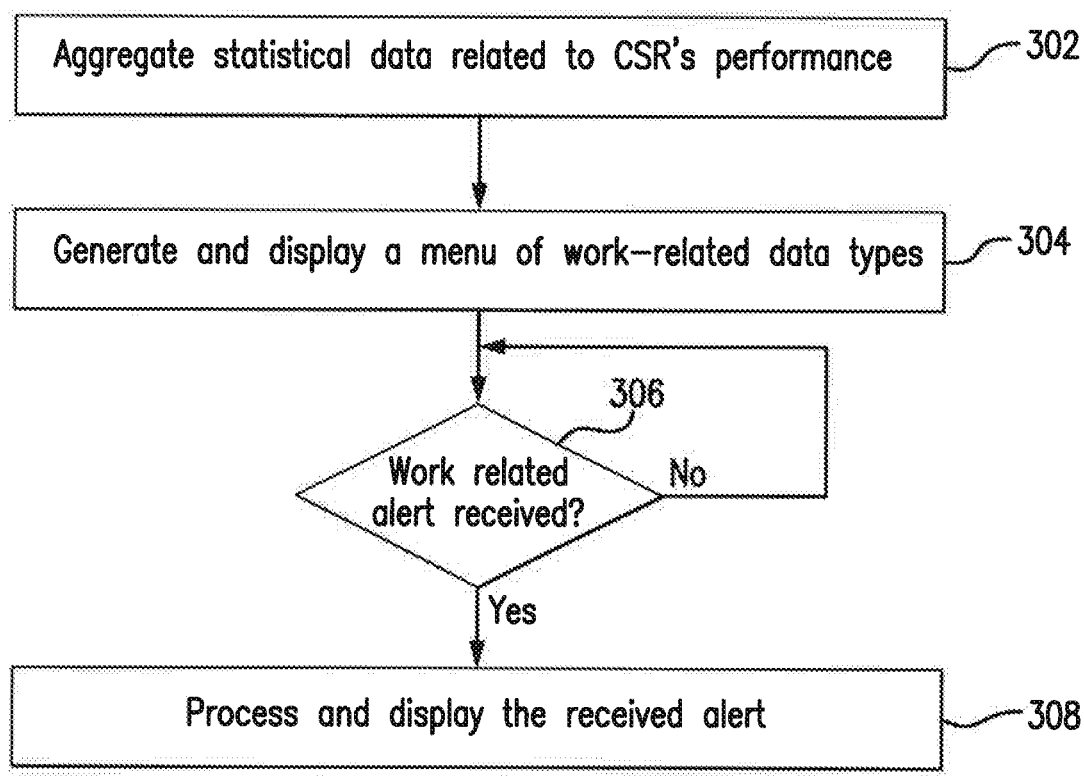
FIG. 3 is a flow chart illustrating an exemplary method for providing performance information related to a customer service representative in accordance with an embodiment of the present application.
Figure 4:
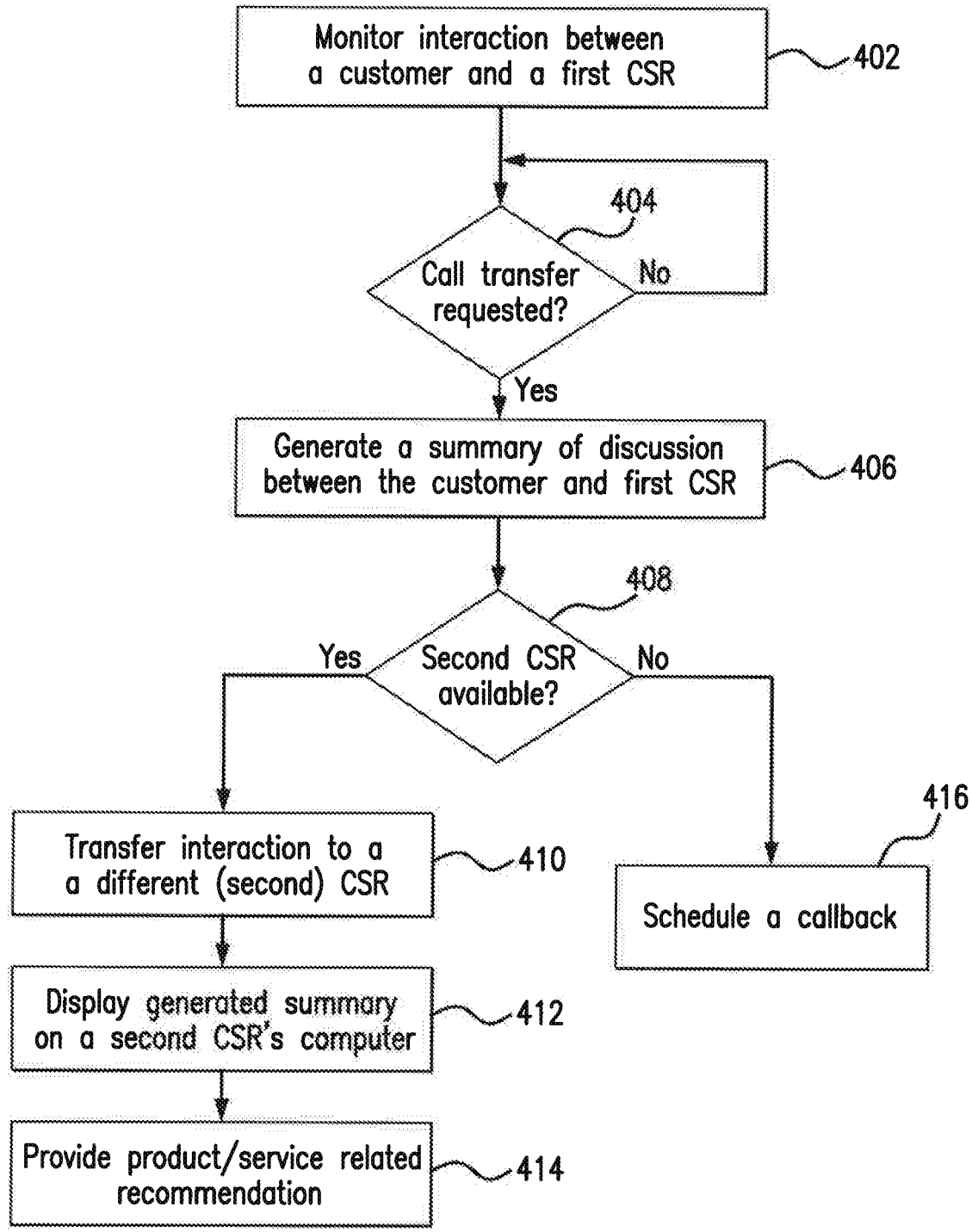
FIG. 4 is a flow chart illustrating an exemplary method for enhancing a customer interaction transfer between customer service representatives in accordance with an embodiment of the present application.
Figure 5:
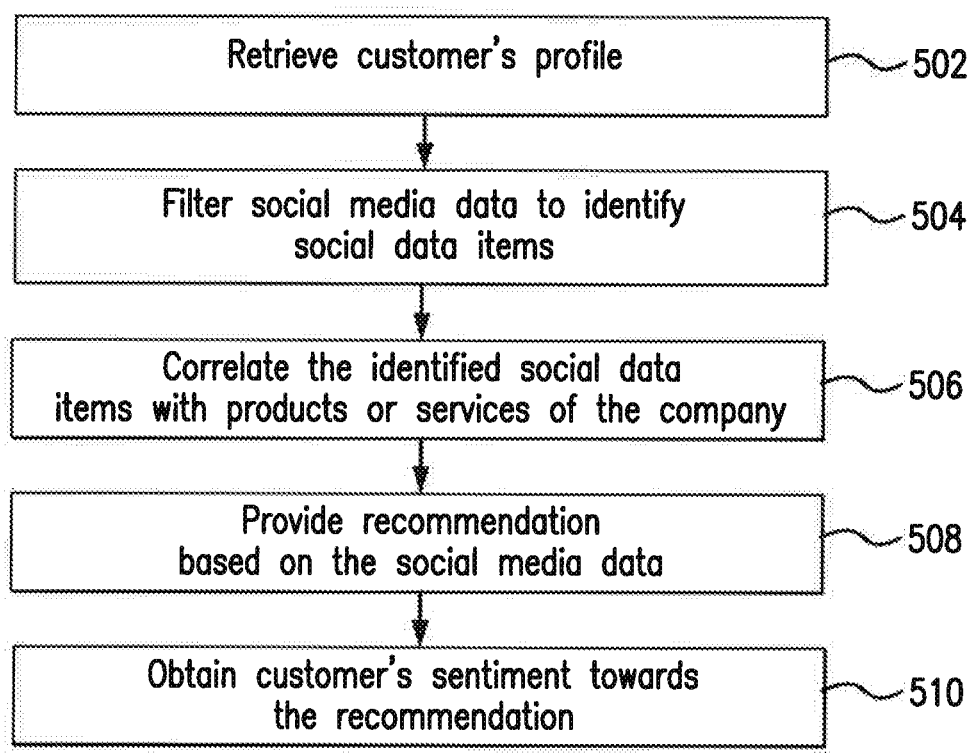
FIG. 5 is a flow chart illustrating an exemplary method for making product recommendations to a customer based on evaluated social media data in accordance with an embodiment of the present invention.
Figure 6:
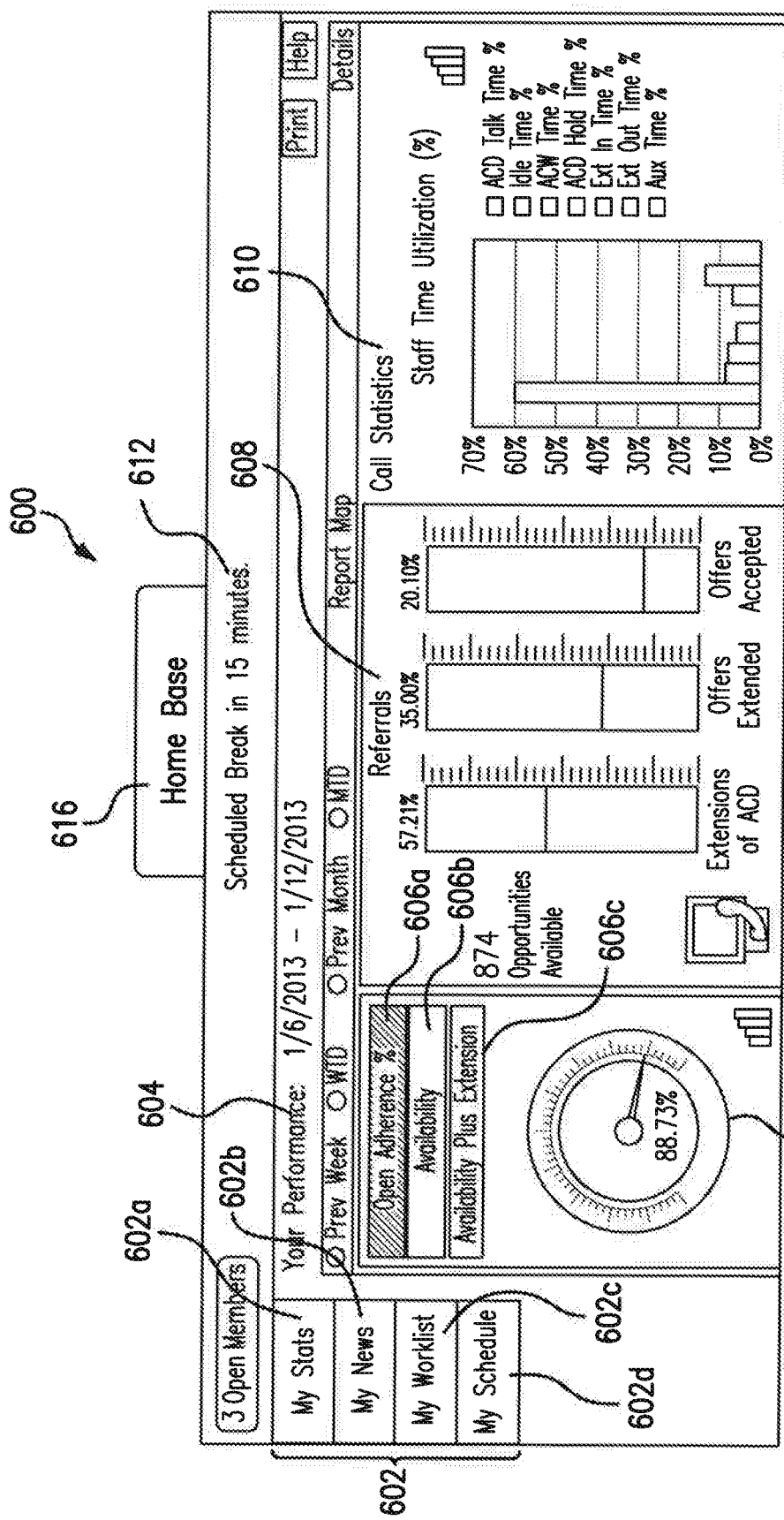
FIG. 6 is an exemplary screen shot providing comprehensive customer service representative performance information in accordance with an embodiment of the present application.
Figure 7:
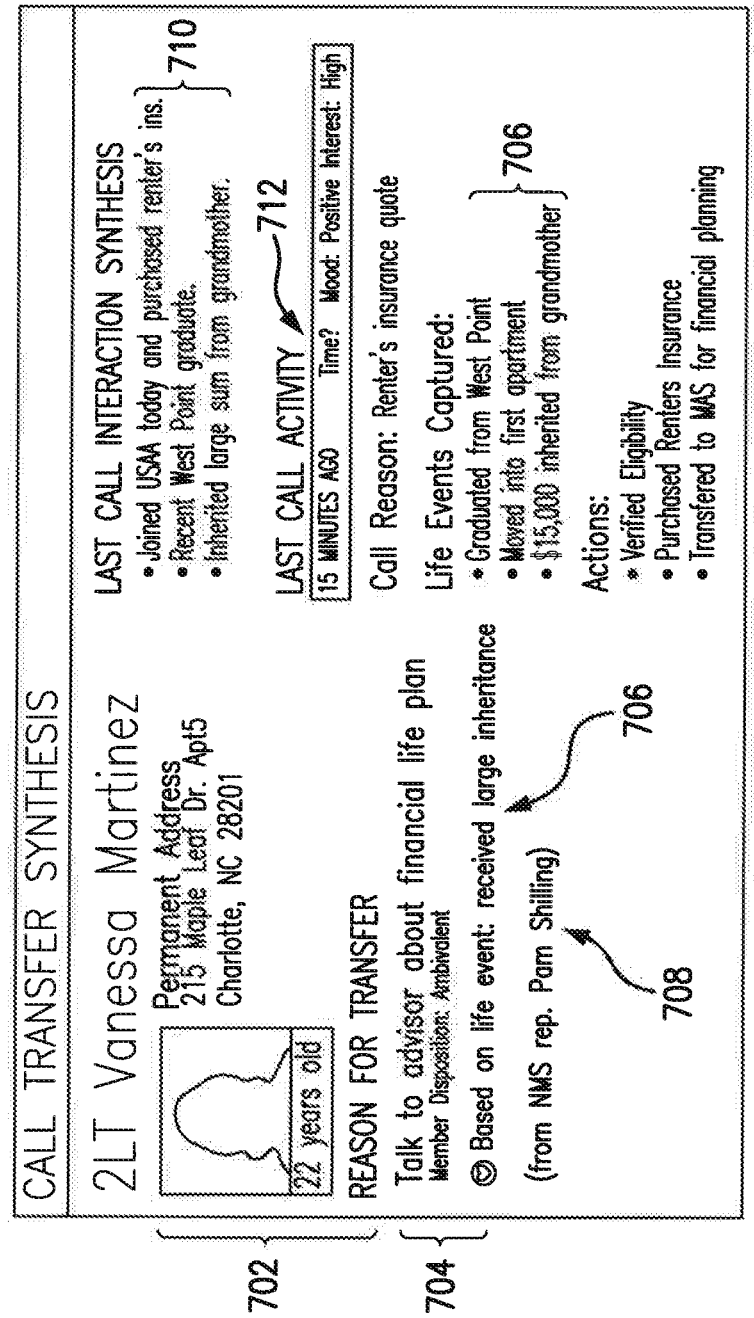
FIG. 7 is an exemplary screen shot facilitating a customer interaction transfer between customer service representatives in accordance with an embodiment of the present application.

FIGS. 3-5 are flowcharts of operational steps of integrated desktop 192 of FIG. 1 in accordance with various illustrative embodiments of the present invention. Before turning to description of FIGS. 3-5, it is noted that the flow diagrams shown therein are described, by way of example, with reference to components shown in FIGS. 1-2, although these operational steps may be carried out in any system and are not limited to the scenario shown in the aforementioned figures. Additionally, the flow diagrams in FIGS. 3-5 show examples in which operational steps are carried out in a particular order, as indicated by the lines connecting the blocks, but the various steps shown in these diagrams can be performed in any order, or in any combination or sub-combination that is practicable. It should be appreciated that in some embodiments some of the steps described below may be combined into a single step or omitted altogether. In some embodiments, one or more additional steps may be included. The flowcharts will be explained with reference to a graphical user interface shown in the remaining figures (FIGS. 6, 7 and 8). While several illustrative embodiments are described herein with reference to phone interactions between a customer and a customer service representative, it should be clear that various embodiments of the present invention are equally applicable to "online chat", instant messaging, video conferencing and other forms of interaction.

The graphical user interfaces (also referred to as "screens" or "desktop") created and used by customer service representative system 100 incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons and the like. These features can be selected (i.e., "clicked on") by a user via connected mouse, keyboard, voice command or other commonly used tools for indicating a preference. FIGS. 6, 7 and 8, which are discussed in detail below, illustrate exemplary graphical user interfaces utilized by customer service representative system 100 according to various embodiments of the present invention.

Turning to FIG. 3, illustrated therein is a flow chart explaining an exemplary method for providing performance information related to a customer service representative in accordance with an embodiment of the present application. Starting at step 302, integrated desktop 192 is displayed on device 190 operated by a representative of a company. In one embodiment at step 302, integrated desktop 192 collects and aggregates statistical data related to customer service representative's performance from server 102. After aggregating and filtering the collected data, integrated desktop 192 preferably presents such data to users (i.e., customer service representatives), for example, on screen 600 of the graphical user interface.

The information provided in screen 600 shown in FIG. 6 assists customer service representatives in evaluating and improving efficiency and job performance. Exemplary screen 600 provides quick and easy access to performance statistics and other information via the Internet, a company intranet or the like. The information may be both specific to a customer service representative and general information useful for all customer service representatives. As noted above, the customer service representative accesses integrated desktop application 192 of the customer service representative system 110 and, thereby, screen 600 by using one of the client computing devices 190.

Referring again to FIG. 3, at step 304, integrated desktop 192 generates and displays a menu that comprises a plurality of different menu items corresponding to different types of data. For example, referring back to FIG. 6, screen 600 includes a section 616 entitled "HomeBase." This "Home-Base" section 616 includes a group of menu items in the form of navigation tabs 602*a-d* for navigating between different screens. Each screen is configured to present a particular type of data. In this embodiment, first tab 602*a* allows access to the "My Stats" screen 600 of FIG. 6. Second tab 602*b* accesses an exemplary "My News" screen.

In one embodiment, the "My News" screen provides company and customer service representative specific news information. Third tab 602c accesses an exemplary "My Worklist" screen, which provides information related to customer service representative's work list indicating work tasks to be performed by the customer service representative. The work list may be received from a corresponding workflow system. In various embodiments, the tasks may be assigned by a manager or entered by the customer service representatives to trigger follow ups and provide task specific reminders. Fourth tab 602d shown in FIG. 6 accesses an exemplary "My Schedule" screen, which may provide appointments and tasks in a calendar format. In addition the "My Schedule" screen can track compensation time, accruable benefits, holidays and the like for the customer service representative.

In an embodiment of the present invention, "HomeBase" section 616 also includes a performance report 604 entitled "Your Performance". Performance report 604 contains summary information about the performance of the customer service representative. The displayed summary information includes at least part of the statistical data aggregated by integrated desktop 192 in step 302. In one embodiment, performance report 604 includes data filtered in accordance with a time period selected by the customer service representative, such as, but not limited to, the previous week, week-to-date (WTD), previous month or month-to-date (MTD). As shown in FIG. 6, performance report 604 may include a second group of user-selectable navigational tabs 606a-c for accessing particular subset of information related to the performance of the customer service representative. In one embodiment these tabs may include "Open Adherence" tab 606a, "Availability" tab 606b and "Availability Plus Extension" tab 606c.

In response to the selection of the "Open Adherence" report tab 606a, integrated desktop 192 displays open adherence information as illustrated in FIG. 6. In one embodiment, open adherence may comprise the amount of time that a customer service representative is available and ready to accept service calls during the selected time period in which the customer service representative is supposed to be taking such calls. In this embodiment the open adherence information includes a gauge element 618 indicating the adherence level. For instance, the gauge element 618 depicted in FIG. 6 indicates that the open adherence percentage for this customer service representative is approximately 89%, In a similar manner, in response to the selection of "Availability" report tab 606b and "Availability Plus Extension" report tab 606c, integrated desktop 192 displays customer service representative's availability and "availability plus extension" information, respectively, not shown in FIG. 6.

In an illustrative embodiment, performance report 604 may also contain referrals information 608 which may also be shown in a graphical form. In one embodiment, the referrals information is shown as visual information resembling a bar chart or other types of graphs. The visual format of the performance data may take on many forms and must be consumable by the Customer Service Representative. According to an embodiment of the present invention, integrated desktop 192 further includes an integrated "soft" phone. The soft phone is integrated with the desktop 192 to allow customer service representatives control calls and review information related to these calls. Accordingly, performance report 604 may further contain a section 610 indicative of customer service representatives' call statistics. Such call statistics may also be presented in a graphical form and may include, without limitation, representative's average talk time, average idle time, average hold time, and the like.

In addition to the soft phone, integrated desktop 192 may be integrated with an alert engine. The alert engine may be configured to send various alerts and notifications to customer service representatives while they work. For example, the alert engine may be configured to provide various reminders associated with customer service representative's schedule information. Referring again to FIG. 3, at step 306, integrated desktop 192 periodically checks if there are any work-related alerts received from the alert engine. In response to determining that at least one alert has been received, integrated desktop 912 presents at least some of such alerts/reminders in an informational bar 612 of the "HomeBase" screen 600 at step 308. For example, the alert presented in FIG. 6 reminds the representative that a break is scheduled in about 15 minutes.

Referring now to FIGS. 4 and 7, one or more embodiments of the present invention contemplate that at any time in the process of interaction with a customer, responsibility for the customer interaction as well as a screen that may include the customer's information and/or the conversation summary may be transferred from one representative to another representative. FIG. 4 is a flow chart illustrating an exemplary method for enhancing a customer interaction transfer between customer service representatives in accordance with an embodiment of the present application. At step 402, a desktop and/or interface, such as integrated desktop 192, is displayed and/or communicated to a representative, for example via computing device 190. Integrated desktop 192 may present a screen that may include customer information that identifies and/or relates to a first representative handling the interaction with the customer. Furthermore, at step 402, after the first representative commences an interaction with the customer, integrated desktop 192 may start monitoring such interaction.

According to an embodiment of the present invention, the original screen presented to the first representative by integrated desktop 192 in step 402 may include a button to transfer the interaction to another party within the company. For example, if the customer requests specific details about life insurance policies in the customer's state of residence, the call may be transferred to a specialist (referred to hereinafter as a second customer service representative) that is familiar with the questions and/or issues that the customer may present. Accordingly, at step 404, integrated desktop 192 may check whether a call transfer was requested by the first representative handling the interaction. In one embodiment, integrated desktop 192 determines at step 404 if the transfer button was pressed by the first representative.

As indicated above, it is contemplated that during a customer interaction transfer between the first and second representatives certain information such as customer's information, conversation summary and/or customer's disposition towards the second representative's product specialty, may be transferred from one representative to another representative. According to an embodiment of the present invention, in response to determining that the transfer button has been pressed by the first representative (decision block 404, "yes" branch), at step 406, integrated desktop 192 generates a conversation summary corresponding to first representative's interaction with the customer. The generated summary may include conversation details and a reason the interaction was transferred to the second representative, for example. The conversation summary generated by integrated desktop 192 at step 406 is discussed below with reference to FIG. 7.

In one embodiment of the present invention, in response to a received transfer request, at step 408, integrated desktop 192 determines whether the second representative (i.e., a specialist familiar with the issues that the customer may present) is available. For example, the soft phone integrated with the desktop 192 may maintain a list of available representatives ready to handle a customer interaction. If integrated desktop 192 determines that the requested specialist is not available (decision 408, "no" branch), instead of transferring the interaction, integrated desktop 192 may prompt the first representative to offer the customer a scheduled callback time. If the customer is interested, at step 416, integrated desktop 192 may schedule such callback. In one embodiment, the scheduled callback may be associated with one or more time periods.

In response to determining that the second representative is available (decision block 408, "yes" branch), at step 410, integrated desktop 192 automatically performs the interaction transfer at step 410. In one embodiment, this step may be accomplished by a specific communication protocol between respective instances of the integrated desktop 192 running at respective first and second representative's devices 190. Further, if the interaction comprises a phone call, it is contemplated herein that the second representative may first be conferenced into the phone call, and after an introduction is made, the first representative may exit the phone call.

Next, at step 412, integrated desktop 192 presents customer's information along with the conversation summary generated at step 406 to the second representative, Referring now to FIG. 7, FIG. 7 illustrates at least a portion of an interaction transfer screen 700 presented to at least the second customer service representative during an interaction transfer. It is noted that in some embodiments, interaction transfer screen 700 may be automatically provided by integrated desktop 192 to both of the involved customer service representatives upon selection of the call transfer option.

As illustrated in FIG. 7, interaction transfer screen 700 provides relevant personal information about the customer. For example, an exemplary screen shot shown in FIG. 7 is for a customer named Vanessa Martinez. Furthermore, interaction transfer screen 700 provides customer's permanent address in a first section 702, In addition, interaction transfer screen 700 includes information enabling the second representative to determine the customer's status, last prompt, recent activities and the reason why the interaction is being transferred. In the embodiment illustrated in FIG. 7 such information includes a reason for transfer section 704, last interaction summary section 710 and conversational status (e.g., last call activity) section 712.

It is noted that in some embodiments, prior to transferring the interaction, the first representative may enter information associated with one or more personal events (related to the customer). For example, assume that the second representative is a financial adviser. Interaction transfer screen 700 illustrated in FIG. 7 depicts a scenario where a customer desires to discuss a financial life plan with an advisor based on a life event 706 (received large inheritance) as a reason for transfer 704. In some embodiments, the conversational status 712 of previous interaction may include information indicative of customer's sentiment and level of interest towards one or more company's products or service based on the first representative's assessment. Summary section 710 may include information generated by integrated desktop 192 step 406 described above. By reviewing the information presented on interaction transfer screen 700, the second customer service representative is better able to have a productive, efficient and smooth dialogue with the customer. It is envisioned that the second customer service representative gleens available cues from interaction transfer screen 700 to form her/his expectations for the upcoming interaction with the customer. Additionally, interaction transfer screen 700 may include a button (not shown in FIG. 7) to transfer the interaction yet to another party within the company. At least in some cases, based on further discussion with the customer, the second representative provides a recommendation and/or guidance with respect to one or more products or services provided by the company. In one embodiment, referring again to FIG. 4, at step 414, integrated desktop 192 assists the second representative with her recommendation by automatically evaluating customer's social media data, as described below.

Referring now to FIGS. 5 and 8, FIG. 5 is a flow chart illustrating an exemplary method for making product recommendations to a customer based on evaluated social media data in accordance with an embodiment of the present invention, while FIG. 8 is a corresponding screen shot that may be shown to a service representative by integrated desktop 192. Starting with FIG. 5, at step 502, integrated desktop 192 may optionally retrieve customer's profile from the server 102. In one embodiment, customer's profile may be stored along with personal information 104. As previously indicated, personal information 104 may include individual customers' social media data. Each customer's social media data may be obtained (with customer's permission) from various online and/or offline sources, such as the contact list from the user's email account(s), messaging account(s), social network account(s), the online chat or discussion groups and forums, websites, etc.

At step 504, integrated desktop 192 filters the social media data to identify at least one social data item that is related to one or more company provided products or services. In one embodiment, integrated desktop 192 may include and/or otherwise cooperate with a filtering engine (not shown in FIG. 1), According to an embodiment of the present invention, the filtering engine uses techniques well-known in the art to refine the raw social media data into a reduced data set that contains the expected most useful information, aligned, for example, by timestamps into time periods of life events. At step 506, integrated desktop 192 may use data mining techniques to identify the specific social data items (i.e., life events, interests, etc.) that may relate to the one or more products or services. It is contemplated that at step 506 integrated desktop 192 also utilizes a correlation mechanism that applies a plurality of predefined business rules 108 (resident, for example, in a business rules engine) to the identified social data items to identify a set of solutions, products and services of the company that best address customers' needs.

According to an embodiment of the present invention, at step 508, integrated desktop 192 further formulates a suggested recommendation and/or solution and presents such suggestion to a service representative. In one embodiment, integrated desktop 192 may present the recommendation via an exemplary recommendation screen 800 shown in FIG. 8. In various embodiments, recommendation screen 800 may be integrated into previous screens discussed herein or may be presented as part of a separate screen. In the embodiment illustrated in FIG. 8, recommendation screen 800 includes information obtained from customer's profile and/or social media data. For example, such information may include, but not limited to, personal information 802, family information 806, product preference information 808, interests information 812, and the like. In one embodiment, customers' personal information 802 may include their name, permanent address, occupation, and the like. The provided family information 806 may include basic information (i.e., name and age) of customer's immediate family members. In one embodiment, information presented in the interests 812 and/or preferences 808 sections may be based on social media data items identified by integrated desktop 192 at step 504 described above. In some embodiments, recommendation screen 800 may optionally include a notes section 804 and a local events section 810. Notes information section 804 may provide various notes recorded by the service representatives engaged in the current or previous interactions with the customer. Local events section 810 may contain information about current local events associated with customer's interest and happening near customer's home or business. It is noted that integrated desktop 192 may determine location of customer's home or business based on customer's profile information, for example. In various embodiments, integrated desktop 192 may obtain information related to local events from a local news search engine, the Internet or other sources integrated with the desktop 192. It is further noted that the recommendation generated by integrated desktop 192 may be presented as a separate pop-up window or as another section of recommendation screen 800. Advantageously, by reviewing the information presented on recommendation screen 800, the customer service representative is enabled to discuss the customer's needs in view of their current life situation.

By discussing the customer's needs in view of their current life situation, the customer service representative guides the customer in a discussion of recommended solutions, options and opportunities. Because of the assistance of integrated desktop program 192 running on system 100, the customer service representative helps the customer think through concerns and possible objections. By making the customer feel empowered to decide on the course of action, the customer is willing and likely to select solutions, products and services of the company that best address their needs and aspirations. Furthermore, by evaluating customer's social media data, integrated desktop 192 helps the customer service representative see a global view for the customer and respond when the customer requests assistance. By asking questions to make sure that the customer service representative truly understands the needs of the customer, a shared understanding of the requests and needs is accomplished. From this point, the customer and the customer service representative can engage in detailed tactical work, still within the integrated desktop 192, to bring provided recommendations to fruition and tasks to completion. Referring back to FIG. 5, at step 510, the customer service representative may obtain customer's sentiment towards the recommended solutions, products and services of the company which may be saved and utilized by integrated desktop 192 during future analysis of customer's needs.

It is to be appreciated that additional illustrated embodiments include, in addition to showing statistical data regarding customer service representative performance, generating and providing coaching type of assistance, information and advice to a customer service representative, preferably contingent upon the performance data gathered for that customer service representative. For instance, this is particularly advantageous with the scenario when a representative is behind on their goals (beyond just alerts), It is noted the aforesaid information provided may encompass quick coaching tips and links to deeper materials, online training courses and resource materials.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer server configured to generate a Graphical User Interface (GUI) for enhancing a call transfer between a first customer service representative and a second customer service representative regarding a customer, comprising:
   a memory for storing information relating to a customer and information relating to prior interactions between the customer and a customer service representative;
   a processor coupled to the memory and networked coupled to the customer, the processor being instructed to:
   generate, by the processor automatically and without human intervention, a conversation summary between a first customer service representative and the customer regarding a current telephonic interaction between the customer and the first customer service representative wherein the generated conversation summary includes identification of, based upon one or more business rules, at least one life event relating to the customer discussed in the current telephonic interaction between the customer and the first customer service representative;
   store the conversation summary in the memory;
   transfer the telephonic interaction from the first customer service representative to a second customer service representative in response to the customer's selection;

generate a GUI having a plurality of sections on a single screen including:
1) the processor generated telephonic conversation summary retrieved from the memory regarding the discussion between the first customer service representative and the customer indicating the reason for transfer;
2) the at least one determined life event relating to the customer discussed in the current telephonic interaction between the customer and the first customer service representative; and
3) a summary of a previous interaction relative to the current interaction involving the customer including: a) a length of time for the previous interaction; b) a mood of the customer during the previous interaction; and c) a reason for the previous interaction based at least in part on a received personal event related to the customer; and display the generated GUI to both the first and second customer representatives to facilitate transfer of the customer telephonic conversation from the first customer representative to the second customer service representative.

2. The computer-implemented method of claim 1, wherein the reason includes customer's sentiment towards the one or more company products.

3. The computer-implemented method of claim 1, wherein the displayed summary includes information related to the first customer service representative.

4. The computer-implemented method of claim 1, wherein transferring the telephonic interaction from the first customer service representative to the second customer service representative comprises scheduling a callback in response to determining that the second customer service representative is not available to handle a telephonic interaction with the customer.

5. The computer-implemented method of claim 4, wherein the scheduled callback is associated with one or more time periods.

6. The computer-implemented method of claim 1, wherein the displayed summary includes customer history information.

7. The computer-implemented method of claim 1, wherein the summary is displayed in an integrated desktop on a device associated with the second customer representative.

8. A computer server configured to generate a Graphical User Interface (GUI) for enhancing a call transfer between a first customer service representative and a second customer service representative regarding a customer, comprising:
a memory for storing information relating to a customer and information relating to prior interactions between the customer and a customer service representative;
a processor coupled to the memory and networked coupled to the customer, the processor being instructed to:
generate, by the processor automatically and without human intervention, a conversation summary between a first customer service representative and the customer regarding a current telephonic interaction between the customer and the first customer service representative wherein the generated conversation summary includes identification of, based upon one or more business rules, at least one life event relating to the customer discussed in the current telephonic interaction between the customer and the first customer service representative;
store the conversation summary in the memory;
transfer the telephonic interaction from the first customer service representative to a second customer service representative in response to the customer's selection wherein transferring the telephonic interaction from the first customer service representative to the second customer service representative includes scheduling a callback in response to determining that the second customer service representative is not available to handle a telephonic interaction with the customer;
generate a GUI having a plurality of sections on a single screen including:
1) the processor generated telephonic conversation summary retrieved from the memory regarding the discussion between the first customer service representative and the customer indicating the reason for transfer;
2) the at least one determined life event relating to the customer discussed in the current telephonic interaction between the customer and the first customer service representative; and
3) a summary of a previous interaction relative to the current interaction involving the customer including: a) a length of time for the previous interaction; b) a mood of the customer during the previous interaction; and c) a reason for the previous interaction; and
display the generated GUI to both the first and second customer representatives to facilitate transfer of the customer telephonic conversation from the first customer representative to the second customer service representative.

9. The computer-implemented method of claim 8, wherein the reason includes customer's sentiment towards the one or more company products.

10. The computer-implemented method of claim 8, wherein the reason is based at least in part on a received personal event related to the customer.

11. The computer-implemented method of claim 8, wherein the displayed summary includes information related to the first customer service representative.

12. The computer-implemented method of claim 8, wherein the scheduled callback is associated with one or more time periods.

13. The computer-implemented method of claim 8, wherein the displayed summary includes customer history information.

14. The computer-implemented method of claim 8, wherein the summary is displayed in an integrated desktop on a device associated with the second customer representative.

* * * * *